C. F. DIECKMANN.
MAGNIFYING RUNNER FOR SLIDE RULES.
APPLICATION FILED FEB. 21, 1921.
1,424,807.
Patented Aug. 8, 1922.
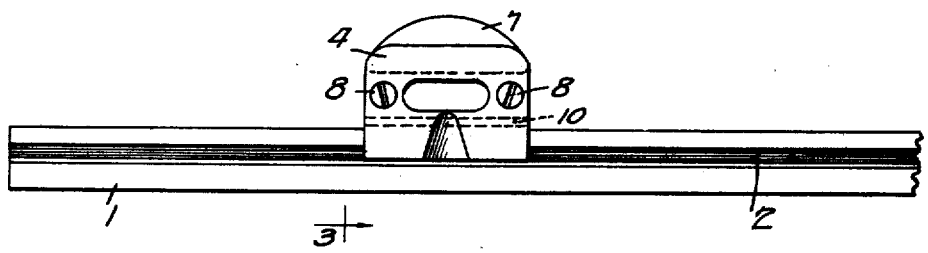
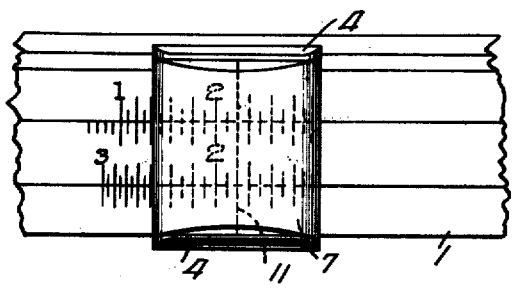
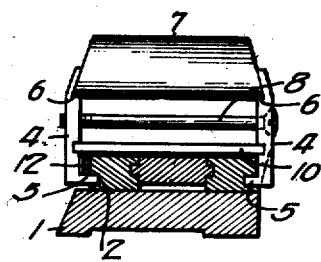
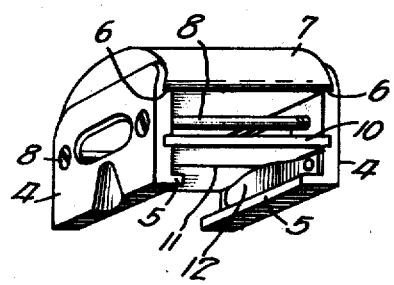
INVENTOR:
CARL F. DIECKMANN,
BY Cheever + Cox
ATTYS.

UNITED STATES PATENT OFFICE.

CARL F. DIECKMANN, OF CHICAGO, ILLINOIS, ASSIGNOR TO EUGENE DIETZGEN COMPANY, OF CHICAGO, ILLINOIS, A CORPORATION OF DELAWARE.

MAGNIFYING RUNNER FOR SLIDE RULES.

1,424,807. Specification of Letters Patent. Patented Aug. 8, 1922.

Application filed February 21, 1921. Serial No. 446,730.

*To all whom it may concern:*

Be it known that I, CARL F. DIECKMANN, a citizen of the United States, residing at Chicago, in the county of Cook and State of Illinois, have invented a certain new and useful Improvement in Magnifying Runners for Slide Rules, of which the following is a specification.

My invention relates to slide rules and especially to the runners thereof, and the object of the invention is to provide means whereby the magnifying glass can be clamped into the runner and securely held by a very simple form of mechanism. I obtain this object by the construction illustrated in the accompanying drawings in which—

Figure 1 is a side elevation of a slide rule on which is mounted a magnifying runner embodying my invention.

Figure 2 is a top plan view of the parts shown in Figure 1.

Figure 3 is a sectional view on the line 3—3, Figure 1 and

Figure 4 is a perspective view of the runner.

Like numerals denote like parts throughout the several views.

Referring to the drawings, the slide rule 1 has the usual side grooves 2 running longitudinally and forming guides for the runner. The runner itself has two side plates 4. 4 each of which has a bottom flange 5 adapted to travel in the lateral grooves 2 of the rule. These plates project considerably above the upper surface of the rule and at the upper end have internally beveled rabbets 6 which receive the beveled ends of the magnifying glass 7. This glass, in the design shown, is flat on the bottom and cylindrical on the top and the beveled ends fit snugly into the correspondingly beveled rabbets of the side plates.

The side plates are held in close engagement with the ends of the magnifying glass by tie rods 8. By preference there are two of these rods, one near each end of the plates thus leaving an open field in the center through which the scales may be read. These tie rods are shown in the form of headed screws, although the particular design of the rods is unimportant.

Beneath the rods there is a transparent cross plate 10 rabbeted into the side plates and having marked on its under side a reading line 11. The parts are so proportioned that this cross plate will lie in close proximity to but out of actual contact with the upper surface of the rule, as best shown in Figure 3.

In order to prevent the runner from sliding too readily along the rule, it is desirable to fasten a spring 12 on the inner face of one of the side plates in position to frictionally engage the side of the rule as best shown in Figures 3 and 4.

Operation: As the magnifying glass 7 has a cylindrical upper surface, it serves to magnify the appearance of that portion of the scale which lies within the field of the glass, as illustrated in Figure 2. The result is that the user of the rule may adjust both the runner and the sliding portion of the rule accurately. As to the functioning of the parts of the runner itself, it will be evident that the two members 7 and 10,— that is, the magnifying glass and the transparent plate beneath, form struts which counteract the tension of the tie rods 8, the result being that the runner as a whole becomes a rigid framework of very simple construction and yet of much strength and rigidity. The rods can be tightened to any desired degree without causing them to bind in the guide grooves 2 of the rule. Both of the transparent plates 7 and 10 may be regarded as spacers, limiting the degree to which the two side plates may be drawn toward each other. On account of the beveling of the ends of the magnifying glass, and the corresponding rabbeting of the side plates, it is not essential to employ any other fastening means than the tie rods for holding the magnifying glass in position. Of course, cement may be employed to supplement the action of the tie rods if desired, but it is not necessary. On account of the rabbeting of the ends of the lower transparent plate into the sides of the side plates, it may be mounted in close proximity to the rule without danger of rubbing its graduated upper surface. Furthermore, this enables the reading line, which is usually scratched on the under surface of the plate, to lie close to the scales and graduations beneath, and this tends to produce accurate readings and use of the instrument as a whole.

Having thus described my invention, what

I claim as new and desire to secure by Letters Patent, is:

1. A runner for slide rules having upstanding side plates adapted to travel along the rule, a transparent cross member extending from one plate to the other slightly above the upper surface of the rule, and having a reading line marked on it, a magnifying glass the ends whereof abut the inner surfaces of the plates, near the top, and tie rods for drawing the plates firmly against the ends of the transparent cross member and magnifying glass.

2. A runner for slide rules having upstanding side plates adapted to travel along the rule, said plates having internally beveled rabbets at the upper end, a magnifying glass having beveled ends adapted to fit snugly in said rabbet, tie rods for holding the side plates in close contact with the ends of the glass, and a transparent plate the ends whereof abut the inner sides of the side plates a slight distance above the top of the rule.

3. A frame constituting a runner for slide rules, said frame comprising side plates having inward extending flanges at the bottom, said side plates being adapted to rise above the upper surface of the rule, tie rods for drawing said plates toward each other, and two spacers one above and the other below the tie rods, the upper spacer being a lens for magnifying purposes, and the lower spacer being transparent and carrying the reading line.

In witness whereof, I have hereunto subscribed my name.

CARL F. DIECKMANN.